United States Patent [19]

Leung

[11] Patent Number: 5,614,005
[45] Date of Patent: Mar. 25, 1997

[54] WATER RESISTANT SHOE POLISH

[76] Inventor: Ricky Leung, 2378 Robitaille Street, St-Laurent, Quebec, Canada, H4K-2V7

[21] Appl. No.: 625,248

[22] Filed: Apr. 1, 1996

[51] Int. Cl.$^6$ .............................. C09G 1/08; C09G 1/12
[52] U.S. Cl. .................... 106/10; 106/2; 106/3; 106/6; 252/8.57
[58] Field of Search ................ 106/2, 3, 6, 10; 252/8.57

[56] References Cited

U.S. PATENT DOCUMENTS

| | | | |
|---|---|---|---|
| 2,846,330 | 8/1958 | Berthold et al. | 106/10 |
| 3,931,079 | 1/1976 | Wise et al. | 106/8 |
| 4,208,213 | 6/1980 | Muller et al. | 106/10 |
| 4,363,893 | 12/1982 | Hersh | 106/3 |
| 4,497,919 | 2/1985 | Varga et al. | 252/8.57 |
| 4,804,413 | 2/1989 | Lee | 106/8 |
| 5,180,638 | 1/1993 | Teekman | 427/221 |

FOREIGN PATENT DOCUMENTS

| | | | |
|---|---|---|---|
| 588682 | 12/1959 | Canada | 106/10 |
| 220322 | 3/1985 | Germany | 106/6 |
| 3930413 | 1/1991 | Germany | 106/10 |
| 1121278 | 10/1984 | U.S.S.R. | 106/10 |
| 1060620 | 3/1967 | United Kingdom | 106/10 |
| 2227753 | 8/1990 | United Kingdom | 106/10 |

OTHER PUBLICATIONS

Chemical Abstract No. 90:88916, which is an abstract of Czech. Patent No. 174,593 (Oct. 1978).

*Primary Examiner*—Anthony Green

[57] ABSTRACT

A water resistant shoe polish including in addition to a tradition base mixture of wax and turpentine oil, petroleum benzin, high vacuum silicone grease, glycerin, glycerol stearate and stearic acid. The composition greatly enhances the retention period of shoe polish on leather or imitation leather materials.

9 Claims, No Drawings

WATER RESISTANT SHOE POLISH

BACKGROUND OF THE INVENTION

1. Field of the Invention

The present invention relates to a water resistant shoe polish and more particularly pertains to a two-in-one shoe care composition that provides extra long lasting shine, and further is water and salt resistant.

2. Description of the Prior Art

The use of shoe polish is known in the prior art. More specifically, shoe polishes heretofore devised and utilized for she purpose of protecting all kind of footwear are known to consist basically of familiar, expected, and obvious formulations, notwithstanding the myriad of compositions encompassed by the crowded prior art which has been developed for the fulfillment of countless objectives and requirements.

By way of example, U.S. Pat. No. 5,180,638 to Teakman discloses a method for reducing the leachabitly of granular material and granular material obtained using this method. U.S. Pat. No. 4,804,413 to Lee discloses a shoe polish composition. U.S. Pat. No. Design 292,672 to Duell discloses a combined container and applicator for liquid shoe polish or similar article. U.S. Pat. No. 4,363,893 to Hersh discloses shoe polish. U.S. Pat. No. 4,208,213 to Muller and Tailfer discloses a shoe creme polish composition. Lastly, U.S. Pat. No. 3,931,079 to Wise, Murdorh and Paszek discloses a viscosity stabilized wax emulsion polish composition.

While these devices fulfill their respective, particular objectives and requirements, the aforementioned patents do not describe water resistant shoe polish that allows leather or synthetic leather footwear, with one application step, to be polished, softened and protected from water and salt.

In this respect, the water resistant shoe polish according to the present invention substantially departs from the conventional formulas and compositions of the prior art, and in doing so provides an product primarily developed for the purpose of a two-in-one shoe care composition that provides extra long lasting shine, and further is water and salt resistant.

Therefore, it can be appreciated that there exists a continuing need for a new and improved water resistant shoe polish which can be used for a two-in-one shoe care composition that provides extra long lasting shine, and further is water and salt resistant. In this regard, the present invention substantially fulfills this need.

SUMMARY OF THE INVENTION

In view of the foregoing disadvantages inherent in the known types of shoe polishes now present in the prior art, the present invention provides an improved water resistant shoe polish. As such, the general purpose of the present invention, which will be described subsequently in greater detail, is to provide a new and improved water resistant shoe polish and method which has all the advantages of the prior art and none of the disadvantages.

To attain this, the present invention essentially comprises a composition for protecting an exterior surface of footwear. The composition resembles a generally wax based polish. The composition in a presently preferred embodiment, has a base mixture that consists of wax and turpentine oil in an amount less than about 80 percent by weight of the total composition, and petroleum benzin in an amount of about 1 percent to 17 percent by weight. Included in the shoe polish is a high vacuum silicone grease in an amount from about 5 percent to about 75 percent per weight, and a water balance. In the present invention, the wax can be either beeswax or paraffin.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the formulation of other compounds, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved water resistant shoe polish which has all of the advantages of the prior art shoe polishes and none of the disadvantages.

It is another object of the present invention to provide a new and improved water resistant shoe polish which may be easily and efficiently manufactured and marketed.

It is further object of the present invention to provide a new and improved water resistant shoe polish which is a durable and stable composition.

An even further object of the present invention is to provide a new and improved water resistant shoe polish which is susceptible of a low cost of manufacture with regard to both materials and labor, and which accordingly is then susceptible of low prices of sale to the consuming public, thereby making such water resistant shoe polish economically available to the buying public.

Still yet another object of the present invention is to provide a new and improved water resistant shoe polish which provides in the compositions and methods of the prior art some of the advantages thereof, while simultaneously overcoming some of the disadvantages normally associated therewith.

Even still another object of the present invention is to provide a water resistant shoe polish for a two-in-one shoe care composition that provides extra long lasting shine, and further is water and salt resistant.

Lastly, it is an object of the present invention to provide a new and improved water resistant shoe polish including in addition to a tradition base mixture of wax and turpentine oil, petroleum benzin, high vacuum silicone grease, glycerin, glycerol stearate and stearic acid. The composition greatly enhances the retention period of shoe polish on leather or imitation leather materials.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the descriptive matter in which there is illustrated preferred combination of ingredients of the invention.

DESCRIPTION OF THE PREFERRED EMBODIMENT

The composition of the present invention, the water resistant shoe polish composition is comprised of a mixture of specific ingredients. Such ingredients in their broadest context include a base mixture, petroleum benzin and silicone grease. Such ingredients possess properties different from, or in addition to those possessed by the several ingredients in common and cooperate with respect to each other so as to attain the desired objective.

Specifically, the present invention has a three-in-one action on both flexible and rigid substrates which required wax. The term "leather" is meant natural leather and any of the synthetic materials used by those skilled in the art for covering shoes, boots, footwear and saddles. The term "shoes" means all kinds of footwear, including shoes and boots made of either natural or synthetic leather.

In its presently preferred use, the composition is supplied as a film to shoes, boots, gloves or the like, and permitted to form a protective film. If desired, the substrate can be lightly buffed to increase the luster of the compound on the shoe.

The regular wax-based shoe polish of the present invention is present in an amount less than about 80 percent by weight of the total composition. In the preferred composition, the turpentine oil is 32 percent by weight of the entire composition, the wax is 20 percent by weight of the entire composition, and the petroleum benzin is about 7 percent by weight of the entire composition. The silicone grease is present in about 5 percent to 75 percent by weight of the entire of composition, and preferably in a base fluid of methylphenyl silicone.

Additionally, included is a glycerine that is present at about 1 percent to about 3 percent by weight of the entire composition, glyceryl stearate is present at about 0.25 percent to 1.25 percent by weight of the entire composition, and stearic acid is present at about 0.5 percent to 1.25 percent by weight of the entire composition. The intermixture of the above components of the present invention includes water as a balance liquid and produces a special two-in-one shoe care product.

It is possible to employ an oil soluble dye and a perfume to the newly formulated composition. The oil base soluble dye is present at about 0 to 1 percent, preferably 0.5 to 1 percent, while the perfume is present at about 0 to 0.5 percent of the entire composition. The dye that is used with the present composition may be selected from a standard range of colors such as black, brown, burgundy and neutral. The addition of the dye and perfume to the newly formulated composition will produce a special three-n-one shoe care product.

The glycerin, glyceryl stearate and stearic acid allow the shoe polish composition to remain soft for an indefinite period of time. These components also keep the leather of the shoe soft and supple throughout the useful life the shoe. The application of these components prevent the leather of the shoe from cracking and drying out.

The silicone grease used, is commercially known as a high vacuum grease. The silicone grease contains a special methylphenyl silicone-base grease which is a very strong water and salt repellant. Moreover, the silicone-based grease, has low volatility that allows it to stay on the leather/substrate of the shoes for an extended period of time. The low volatility, of the grease, is a protectant in extreme temperatures and through exposure to salt-field slush and puddles. The high vacuum grease used in the present invention has the following physical-chemical characteristics:

| | |
|---|---|
| Physical form | stiff grease |
| Main base fluid | methylphenyl silicone fluid |
| Color | translucent |
| Thickening agent | calcium soap |
| Service temperature | −40° to 204° C. (−40° to 400° F.) |
| Special properties | non-oxidizing, non-gumming |
| Water resistance | excellent |
| Solubility | Insoluble in water, methanol, ethanol, acetone, glycerin. Dispersed in kerosene, toluene, ethyl ether, and petroleum ether. |
| Chemical resistance | Resistant to most aqueous solutions of inorganic salts and to dilute acids and alkalis, most vegetable and mineral oils and many organic compounds. |
| Bleed, after 24 hrs/200° C., % max | 0.5 |
| Evaporation, after 24 hrs/ 199° C., max | 2.0 |
| Specific gravity at 25° C. g/cc | 1.0 |
| Melting point | none |
| Penetration, | |
| unworked | 175 to 210 |
| worked 60, max | 26 |

Water, the balancing component of the composition is preferably about 3 percent by weight. Water concentration greater than about 3 percent will decrease the ability of the glycerin, glycerol stearate and stearic acid to keep the leather of the shoe soft and supple. Preferably the water used is deionized water which has all the ionizable organic and inorganic salts removed. Deionized water will ensure the uniformity of the composition because there is no reaction between the new composition and salts in the water. In practice, the composition is typically applied as a film, and the water is permitted to evaporate. The illustrious coating remains after the evaporating and resists future attack by water or other polar media.

EXAMPLE

A PRESENTLY PREFERRED COMPOSITION CONTAINS BY WEIGHT: ABOUT 32 PERCENT TURPENTINE OIL, ABOUT 20 PERCENT WAX, ABOUT 7 PERCENT PETROLEUM BENZIN, ABOUT 1 PERCENT MISCELLANEOUS, ABOUT 30 PERCENT HIGH VACUUM GREASE, ABOUT 2.5 PERCENT GLYCERIN, ABOUT 0.75 PERCENT GLYCEROL STEARATE, ABOUT 0.7 PERCENT STEARIC ACID, ABOUT 1 PERCENT DYE, ABOUT 0.1 PERCENT PERFUME AND THE BALANCE IS WATER.

Deionized

The present invention is a one application shoe care composition that provides three-in-one action to the shoe. The present shoe care composition polishes, softens and protects leather and synthetic footwear without the cost of time and multiple shoe care products. The water resistant shoe polish composition replaces the two-step polishing and then waterproofing by removing the steps of using the water resistant spray. The two-in-one formula allows for a one time application, hence reduces tremendously the time spent on shoe care. The present invention, if used, eliminates ugly salt and water stains on shoes that have stepped in puddles. The high vacuum silicone grease provides a super water resistance substrate to the leather or synthetic footwear that keeps the feet dry. The luster and shine of the shoe, after the composition has been applied, lasts for a very long period of time. The present invention is very easy to apply through the use a fabric cloth.

As to the manner of usage and operation of the present invention, the same should be apparent from the above description. Accordingly, no further discussion relating to the manner of usage and operation will be provided.

With respect to the above description then, it is to be realized that the optimum volumnemetrical relationships for the ingredients of the composition, to include variations in the amounts of the components by weight of the entire composition and manner of intermixing are deemed readily apparent and obvious to one skilled in the art, and all equivalent relationships to those described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A new and improved water resistant shoe polish composition for protecting an exterior surface of footwear consisting essentially of:

a base mixture consisting of a wax and turpentine oil in an amount less than about 80% by weight of the total composition;

petroleum benzin in an amount from about 1% to about 17 weight percent;

a silicone grease in an amount from about 5% to about 75 weight percent; and the balance of the composition being water.

2. The composition of claim 1, wherein the silicone grease is a methylphenyl silicone-based grease.

3. The composition of claim 1, wherein the wax component is a beeswax.

4. The composition of claim 1, wherein the wax component is a paraffin.

5. The composition of claim 1 additionally consisting essentially of glycerin in an amount ranging from about 1% to about 3 weight percent.

6. The composition of claim 1 additionally consisting essentially of glyceryl stearate in an amount ranging from about 0.25% to about 1.25 weight percent.

7. The composition of claim 1 additionally consisting essentially of stearic acid in an amount ranging from about 0.5% to about 1.25% weight percent.

8. A water resistant shoe polish composition consisting essentially of in addition to a base mixture consisting of a wax and turpentine oil in an amount less than about 80% by weight of the total composition:

petroleum benzin in an amount from about 7 weight percent;

a silicone grease in an amount from about 5% to about 75 weight percent in a methylphenyl silicon base fluid;

an oil-soluble dye in an amount from about 0.5% to 1 weight percent;

a perfume in an amount from about 0% to 0.5 weight percent; and the balance of the composition being deionized water.

9. A water resistant shoe polish consisting essentially of:

turpentine oil in an amount of about 32% by weight;

wax in an amount of about 20% by weight;

petroleum benzin in an amount of about 7% by weight;

silicone grease in an amount of about 30% by weight;

glycerin in an amount of about 2.5% by weight;

glyceryl stearate in an amount of about 0.75% by weight;

stearic acid in an amount of about 0.75% by weight;

an oil soluble dye in an amount of about 1% by weight;

perfume in an amount of about 0.1% by weight; and balance deionized water.

* * * * *